Aug. 6, 1929. T. E. MURRAY, JR 1,723,518
MANUFACTURE OF AUTOMOBILE FRAMES
Filed May 17, 1923 2 Sheets-Sheet 1
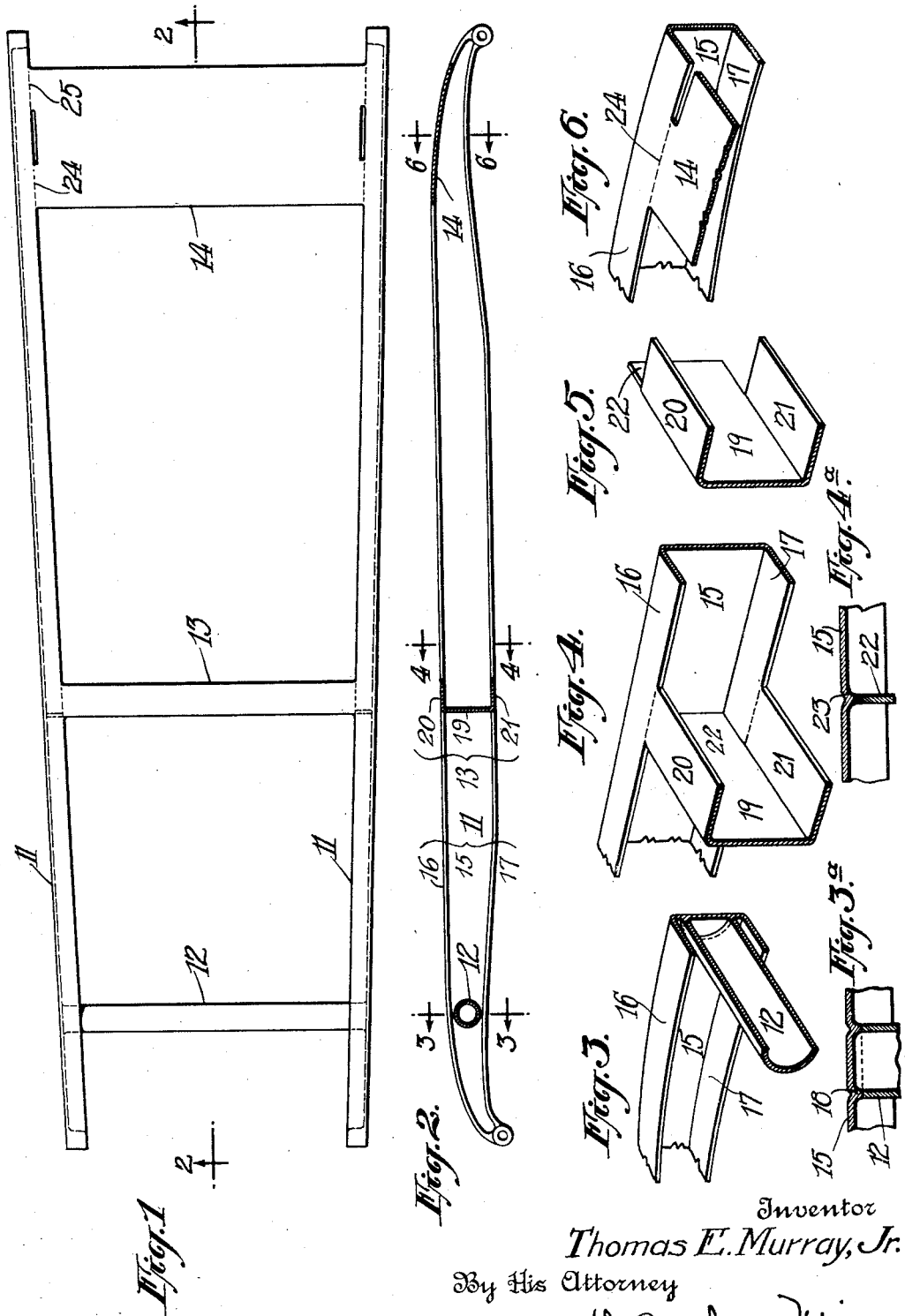
Inventor
Thomas E. Murray, Jr.
By His Attorney

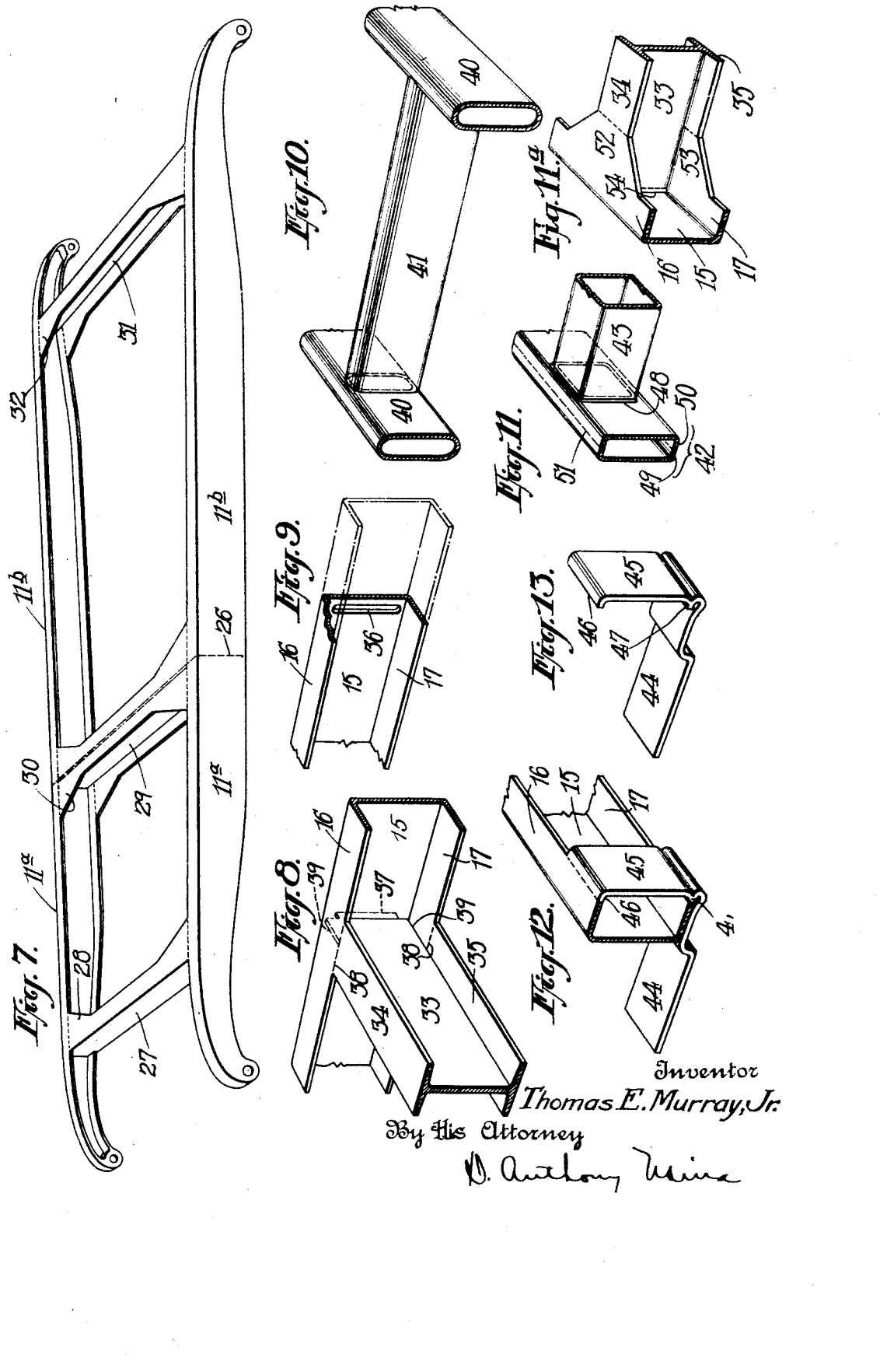

Patented Aug. 6, 1929.

1,723,518

UNITED STATES PATENT OFFICE.

THOMAS E. MURRAY, JR., OF NEW YORK, N. Y.

MANUFACTURE OF AUTOMOBILE FRAMES.

Application filed May 17, 1923. Serial No. 639,631.

My invention aims to provide certain improvements in the manufacture of frames for automobiles whereby they can be made very economically.

The accompanying drawings illustrate embodiments of the invention.

Fig. 1 is a plan of a frame;

Fig. 2 is a section on the line 2—2 of Fig. 1;

Figs. 3 and 4 are sections in perspective on the correspondingly numbered lines in Fig. 2;

Figs. 3ª and 4ª are horizontal sections through the joints illustrated in Figs. 3 and 4 respectively.

Fig. 5 is a detail of a part of Fig. 4;

Fig. 6 is a section in perspective on the line 6—6 of Fig. 2;

Fig. 7 is a perspective view of another design of frame;

Fig. 8 is a perspective view of a modification in detail;

Fig. 9 is a separate perspective of the side member of Fig. 8;

Fig. 10 is a perspective of a frame made of hollow or tubular members;

Fig. 11 is a perspective of a joint between hollow members;

Fig. 11ª is a perspective of a joint between members of another shape.

Fig. 12 is a similar view of a step or bracket or the like applied to one of the members of a frame, and Fig. 13 is a similar view of the same step before application.

Referring first particularly to Figs. 1 to 6, the frame comprises a pair of longitudinal members indicated as a whole by the numeral 11 and united at intervals by transverse braces 12, 13 and 14, the ends of which are butt welded to appropriate parts of the longitudinal or side members. The shapes of the parts may be varied considerably according to the design of the cars for which they are intended or the choice of the designer, and the welded joint may be varied to suit the shapes of the parts.

The side members 11 are made of sheet metal bent or drawn to provide a vertical web 15 and horizontal top and bottom flanges 16 and 17 which converge at the ends where the frame usually has its bearings on the springs. This is of comparatively simple channel shape in cross section. Various other hollow shapes may be utilized.

The transverse brace 12 at the front end is a straight tube fitting between the flanges of the side members and having its ends butt welded directly to the vertical web 15. Preferably, in order to facilitate the welding operation the web is formed with a raised rib 18 (Fig. 3ª) fitting the end of the circular brace 12 and to which the latter is directly welded.

The intermediate transverse member 13 is a straight channel with a web 19 identical in height with the web 15 at the point of contact with the latter and with flanges 20 and 21 which when the parts are united engage the flanges 16 and 17. The shape of the brace before welding is shown in Fig. 5, with a tongue 22 constituting an extension of the web to engage a rib 23, Fig. 4ª, formed on the inner face of the web 15 of the side member. The welded joint is made between the end of the part 22 and the rib 23, and also along the contact edges of the flanges 20 and 21 with the flanges 16 and 17.

The rear brace 14 is preferably made in the form of a broad plate bent to the contour of the upper flanges 16 of the side members and butt welded at its ends to said flanges. The weld may extend continuously from end to end of the joint, but the principal strain is near the ends of the joint and for mechanical reasons it is better to interrupt the contact at the center and to make two welds 24 and 25 near the ends.

According to Fig. 7 the side members are of substantially the same shape as in Figs. 1 and 2, but for simplicity in the shaping operation they are made in two parts 11ª and 11ᵇ constituting the front and the rear portions respectively which are butt-welded to each other at the joint 26. Also I use this figure to illustrate the application of the invention with braces of a different shape from those shown in Fig. 2. The forward brace 27 is a channel with its web entering between the flanges of the side members and with its flanges having ends 28 flared to an increased width where they make contact with and are welded to the flanges of the side members. The intermediate brace 29 is in the form of an I-beam (either rolled in one piece or built up of two channels arranged back to back) with its web also extending between the flanges of the side members and with its flanges having end portions 30 of increased width where they abut against and are welded to the flanges of the side members. The use of such a transverse brace extending across the joint 26 between the front and rear parts of the side members, reinforces this joint. The rear brace 31 is similar to the front brace in being of channel shape with its web extending between the flanges of the side members and welded to the web of the latter and with its flanges having end portions 32 of increased width at the joints with the flanges of the side members. The several braces in Fig. 7 are welded to the side members in the way described in connection with Fig. 1, or the joints may be made in various other ways.

Figs. 8 and 9 illustrate an alternative style of joint between side members having webs 15 and flanges 16 and 17 and a transverse brace in the shape of an I-beam with a web 33 and top and bottom flanges 34 and 35. In this case the web 15 of the side member is provided with an opening 36 of approximately its full height and adapted to receive a tongue 37 constituting an extension of the web 33 beyond the point where the latter abuts against the web 15 of the side frame. The weld in this case may be made along the meeting lines 38 between the flanges of the brace and the flanges of the side members and also along the lines 39 where the extended portion of the web 33 of the brace bears against the inner faces of the flanges of the side members.

The idea is applicable, as stated above, to members which are of various shapes in cross-section. In Fig. 10, there are shown side members 40 of oblong tubular cross-section united by a brace 41 of similar cross-section; the ends of the latter being welded directly to the inside vertical portions of the side members.

In Fig. 11 the same idea is shown applied to side members 42 of rectangular cross-section, united by a transverse brace 43 of square cross-section with its ends welded to the inner vertical portions of the side members.

The closed hollow shapes of Figs. 10 and 11 may be made of sheet metal bent to shape and welded at the edges like ordinary welded tubing or they may be made of drawn seamless tubing.

The idea of applying extensions to the longitudinal members, to which the transverse braces are welded, may be carried out in a variety of ways.

In Fig. 11 there is shown a rib 48 on the inner face of the longitudinal member, to which the end of the cross member 43 is directly welded. This figure is also used to illustrate a longitudinal member 42 made of two sheet metal segments 49 and 50 bent to form flanges which are welded together along their edges, the joint being indicated by the dotted lines 51.

A different style of lateral extension from the longitudinal members is illustrated in Fig. 11a. This shows a channel with a web 15 and flanges 16 and 17. The latter, however, are provided with extensions 52 and 53 at top and bottom, preferably tapering as shown, to which the ends of the flanges of the cross members 33, 34 and 35 are welded. There is also a raised rib 54 or inward extension on the web of the longitudinal member, to which the end of the web of the transverse member is welded.

Extensions of this sort provide a better resistance to the stresses which occur; or conversely they make the joint at a point nearer the longitudinal center of the frame where the stresses are less than at points remote from such center.

I have shown the frames of conventional designs. But it will be understood that the invention is applicable to various other types of frame, and I have used the expression longitudinal members to apply to the side members whether they extend in a truly longitudinal direction or not; and the expression transverse braces to apply to members which extend across between the side members whether they are exactly transverse or not.

The invention may be extended with advantage not only to the making of the principal parts of the frame, but also to the making of frames with special details or extensions such as brackets for engagement with other parts, steps and the like. An example is shown in Figs. 12 and 13 where a step 44 is provided with a flange 45 extending up inside of one of the longitudinal members and having edges 46 and 47 welded to the edges of the flanges 16 and 17 of the side member.

Though I have described with great particularity of detail certain specific embodiments in my invention, yet it is not to be understood that the invention is restricted to the particular embodiments disclosed. Various modifications thereof in detail and in the arrangement of the parts may be made by those skilled in the art without departure from the invention as defined in the following claims.

What I claim is:

1. A frame for automobiles having longitudinal members the cross-section of each of which is composed of a single piece of sheet metal bent to hollow shape with horizontal portions and transverse braces having portions in the plane of the horizontal portions of said longitudinal members and butt-welded edge-to-edge thereto.

2. A frame for automobiles having longitudinal members the cross-section of each of which is composed of a single piece of sheet metal bent to hollow shape with vertical and horizontal portions, and transverse braces having edges butt-welded to the faces of the vertical portions and to the edges of the horizontal portions of said longitudinal members.

3. A frame for automobiles having members of sheet metal bent to form flanges, in combination with a bracket of sheet metal having edges butt-welded to the edges of said flanges.

4. A frame for automobiles having longitudinal members the cross section of each of which is of channel shape with the flanges extending inward, and transverse braces having portions in the plane of the flanges of said longitudinal members and butt-welded edge-to-edge thereto.

5. A frame for automobiles having longitudinal members the cross section of each of which is of channel shape with the flanges extending inward, and transverse braces having vertical edges butt-welded to the inner faces of the vertical portions of said channels, and having horizontal portions in the plane of the flanges of said channels and butt-welded edge-to-edge thereto.

6. A frame for automobiles having longitudinal members the cross section of each of which is of channel shape with horizontal flanges extending inward, and transverse braces having horizontal portions in the plane of the flanges of said longitudinal members, the ends of said horizontal portions abutting against the inner edges of said flanges.

In witness whereof, I have hereunto signed my name.

THOMAS E. MURRAY, Jr.